F. L. WATSON.
RADIATOR VALVE.
APPLICATION FILED AUG. 29, 1912.
1,053,763.
Patented Feb. 18, 1913.
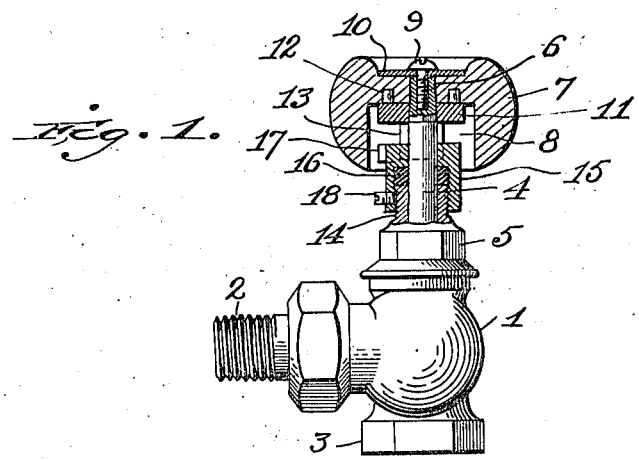
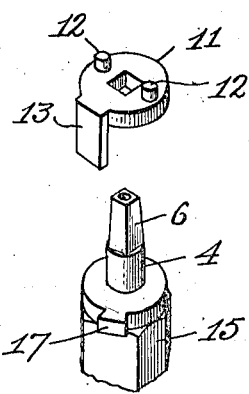

UNITED STATES PATENT OFFICE.

FRANK L. WATSON, OF LYNCHBURG, VIRGINIA.

RADIATOR-VALVE.

1,053,763.  Specification of Letters Patent.  Patented Feb. 18, 1913.

Application filed August 29, 1912. Serial No. 717,771.

*To all whom it may concern:*

Be it known that I, FRANK L. WATSON, a citizen of the United States, residing at Lynchburg, in the county of Campbell, State of Virginia, have invented certain new and useful Improvements in Radiator - Valves; and I do hereby declare the following to be a full, clear, and exact description of the invention, such as will enable others skilled in the art to which it appertains to make and use the same.

My invention relates to improvements in radiator valves, and has for its object certain improvements in the construction of the same as will be hereinafter more particularly described and claimed, reference being had to the accompanying drawing, in which:

Figure 1 is a side elevation of a radiator valve embodying my improved construction, the upper portion of the same being shown in section. Fig. 2 is a detail perspective view of the packing nut with the valve stem extending therethrough, and of the stop plate, the parts being shown separated.

Similar numerals of reference denote corresponding parts in the two views.

In the said drawing the reference numeral 1 denotes the valve body having the usual externally threaded inlet 2 for engagement with the radiator, and the usual internally threaded discharge 3 for connection with the system piping. Any desired form of valve within the body 1 may be employed, which is operated by a valve stem 4 passing through a bonnet piece 5 screwed to said valve body 1, said valve stem having removably mounted on its squared upper end 6 a valve wheel 7 hollowed out or recessed on its under side at 8, said valve wheel being retained in position by a screw 9 and washer 10.

Removably mounted upon the squared portion 6 of the valve stem 4 to rotate therewith is a stop plate 11, having on its upper surface pins 12 adapted to engage in suitable apertures in the upper surface of the hollowed out portion 8 of valve wheel 7, whereby the two must turn together, and having depending at one side an integral lug 13 disposed parallel with the valve stem 4, as shown.

The upper end 14 of the bonnet piece 5 is externally screw threaded, and interposed between the same and the wheel 7 and stop plate 11 is a packing nut 15 in screw threaded engagement with said end 14, and carrying in its upper internal portion a suitable packing 16, the upper portion of said packing nut being reduced to snugly fit around the valve stem 4 and also to retain said packing, and having formed integral therewith on one side a projection 17 disposed in the path of rotation of the lug 13 when the parts are assembled.

In applying radiator valves it is desirable that the valve be capable of adjustment so that it may be opened only far enough to suit the requirement of its particular radiator, which amount of opening will differ in accordance with the location of the radiator with respect to the source of power. One way of accomplishing the desired result is to first place the valve in position on the radiator, and then manipulate the wheel 7 until the valve is opened the required degree. The packing nut 15 is then turned until the projection 16 thereon comes in contact with the lug 13, whereupon a set screw 18 tapped through said nut is tightened against the upper end 14 of bonnet piece 5 to retain the parts in fixed relation, the result being that the opening of the valve will at all times thereafter be limited to the requirement of its particular radiator. Another way of initially adjusting the valve is to remove the valve wheel 7, after the valve has been properly adjusted, and properly positioning the stop plate 11 in the valve wheel to bring its lug 13 to the proper position, the squared configuration of the upper end 6 of valve stem 4 permitting four adjustments, which may have to be followed by a slight additional adjustment of the packing nut 15.

Having thus described my invention, what I claim as new and desire to secure by Letters Patent is:

1. In a valve, a valve body, a rotatable valve stem projecting therefrom, means for operating said valve stem, and relatively adjustable means located in a recess disposed between said stem operating means and said valve body for limiting the rotation of said valve stem in opening said valve.

2. In a valve, a valve body, a rotatable valve stem projecting therefrom, a valve wheel for operating said valve stem having a recessed portion surrounding said valve stem, and relatively adjustable means located in said recessed portion for limiting the rotation of said valve stem in opening the valve.

3. In a valve, a valve body, a rotatable valve stem projecting therefrom, a valve wheel for operating said valve stem having a hollowed out portion surrounding said valve stem, a packing nut interposed on said valve body between the same and said valve wheel and carrying a projection on one side lying within the hollowed portion of said wheel, and a lug carried by said wheel and lying in the path of said projection, whereby the rotation of said wheel will be limited.

4. In a valve, a valve body, a rotatable valve stem projecting therefrom, a valve wheel for operating said valve stem having a hollowed out portion surrounding said valve stem, a packing nut interposed on said valve body between the same and said valve wheel and carrying a projection on one side lying within the hollowed portion of said wheel, a stop plate also located within the hollowed portion of said wheel and adjustably connected to said wheel, and a lug on said plate and lying in the path of said projection, whereby the rotation of said wheel will be limited.

In testimony whereof I have hereunto set my hand in the presence of two subscribing witnesses.

FRANK L. WATSON.

Witnesses:
  JULIA J. LARINDER,
  ELIZABETH D. WHEAT.